US009223752B2

(12) United States Patent
Azadet et al.

(10) Patent No.: US 9,223,752 B2
(45) Date of Patent: *Dec. 29, 2015

(54) DIGITAL SIGNAL PROCESSOR WITH ONE OR MORE NON-LINEAR FUNCTIONS USING FACTORIZED POLYNOMIAL INTERPOLATION

(75) Inventors: Kameran Azadet, Morganville, NJ (US); Jian-Guo Chen, Basking Ridge, NJ (US); Samer Hijazi, Bethlehem, PA (US); Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 1264 days.

This patent is subject to a terminal disclaimer.

(21) Appl. No.: 12/324,934

(22) Filed: Nov. 28, 2008

(65) Prior Publication Data

US 2010/0138465 A1    Jun. 3, 2010

(51) Int. Cl.

| | |
|---|---|
| *G06F 17/17* | (2006.01) |
| *G06F 17/10* | (2006.01) |
| *G06F 1/035* | (2006.01) |
| *G06F 9/30* | (2006.01) |
| *G06F 9/38* | (2006.01) |

(52) U.S. Cl.
CPC .............. *G06F 17/10* (2013.01); *G06F 1/035* (2013.01); *G06F 9/3001* (2013.01); *G06F 9/383* (2013.01)

(58) Field of Classification Search
None
See application file for complete search history.

(56) References Cited

U.S. PATENT DOCUMENTS

| | | | |
|---|---|---|---|
| 5,333,118 A | 7/1994 | Rossmere et al. | |
| 5,864,689 A * | 1/1999 | Tran | 712/208 |
| 6,026,420 A * | 2/2000 | DesJardins et al. | 708/492 |
| 6,243,143 B1 | 6/2001 | Hatalsky et al. | |
| 6,529,922 B1 | 3/2003 | Hoge | |
| 6,844,880 B1 * | 1/2005 | Lindholm et al. | 345/506 |
| 7,336,721 B2 * | 2/2008 | Lee et al. | 375/295 |
| 2007/0112902 A1 * | 5/2007 | Dance et al. | 708/500 |
| 2008/0005213 A1 | 1/2008 | Holtzman | |

* cited by examiner

*Primary Examiner* — Henry Tsai
*Assistant Examiner* — Dean Phan
(74) *Attorney, Agent, or Firm* — Nicholson De Vos Webster & Elliott LLP

(57) ABSTRACT

A digital signal processor and method are disclosed with one or more non-linear functions using factorized polynomial interpolation. A digital signal processor evaluates a non-linear function for a value, x, by obtaining two or more values from at least one look-up table for said non-linear function that are near said value, x; and interpolating said two or more obtained values to obtain a value, y, using a factorized polynomial interpolation.

20 Claims, 3 Drawing Sheets

DIGITAL SIGNAL PROCESSOR WITH ONE OR MORE NON-LINEAR FUNCTIONS USING FACTORIZED POLYNOMIAL INTERPOLATION

CROSS-REFERENCE TO RELATED APPLICATIONS

The present application is related to U.S. patent application Ser. No. 12/324,926 entitled "Digital Signal Processor Having Instruction Set with One or More Non-Linear Complex Functions;" U.S. patent application Ser. No. 12/374,927, entitled "Digital Signal Processor Flaying Instruction Set with One or More Non-Linear Functions Using Reduced Look-Up Table;" and U.S. patent application Ser. No. 12/324,931, entitled "Digital Signal Processor Having Instruction Set with One or More Non-Linear Functions Using Reduced Look-Up Table with Exponentially Varying Step-Size," each tiled contemporaneously herewith and incorporated by reference herein.

FIELD OF THE INVENTION

The present invention is related to digital signal processing techniques and, more particularly, to techniques for digital processing of non-linear complex functions.

BACKGROUND OF THE INVENTION

Digital signal processors (DSPs) are special-purpose processors utilized for digital processing. Signals are often converted from analog form to digital form, manipulated digitally, and then converted back to analog form for further processing. Digital signal processing algorithms typically require a large number of mathematical operations to be performed quickly and efficiently on a set of data.

DSPs thus often incorporate specialized hardware to perform software operations that are often required for math-intensive processing applications, such as addition, multiplication, multiply-accumulate (MAC), and shift-accumulate. A Multiply-Accumulate architecture, for example, recognizes that many common data processing operations involve multiplying two numbers together, adding the resulting value to another value and then accumulating the result. Such basic operations can be efficiently carried out utilizing specialized high-speed multipliers and accumulators.

DSPs, however, generally do not provide specialized instructions to support complex mathematical functions, such as exp, log, cos, $1/x$ and $x^K$. Increasingly, however, there is a need for complex arithmetic operations in processors. A non-linear function is any problem where the variable(s) to be solved for cannot be written as a linear sum of independent components. A complex number can be written in the form $a+bi$, where a and b are real numbers, referred to as the real part and the imaginary part of the complex number, respectively. Many applications require complex arithmetic operations, such as complex addition or complex multiplications.

If supported at all, a DSP supports a non-linear function by using a large table look-up (LUT). An exemplary LUT may store on the order of 2,000 16 bit values, and thus require 32 kilobits of random access memory (RAM). The LUT is typically implemented in a separate dedicated SRAM (so that data and the non-linear LUT can be accessed at the same time to achieve improved performance).

In cases where the DSP is based on VLIW (Very Long Instruction Word) or SIMD (Single Instruction Multiple Data) architectures with N issues slots, the memory size becomes even larger. The LUT must be replicated N times because each issue slot must be able to read different values in the look-up table simultaneously, as the values of the data in each issue slot may be different. This replication of memory results in an even greater silicon area. For example, assuming a LUT in a 4-way vector co-processor, a memory size of 128 Kb is required (32 Kb×4). In addition, if different non-linear functions are required for different parts of a program being executed, the various LUTs must be loaded into memory, thereby significantly increasing latency and potentially reducing performance.

A need therefore exists for a digital signal processor having an instruction set that supports one or more non-linear functions using a look-up table of reduced size.

SUMMARY OF THE INVENTION

Generally, a digital signal processor and method are disclosed with one or more non-linear functions using factorized polynomial interpolation. According to one aspect of the invention, a digital signal processor evaluates a non-linear function for a value, x, by obtaining at least two values from at least one look-up table for said non-linear function that are near said value, x; and interpolating said at least two obtained values to obtain a value, y, using a factorized polynomial interpolation.

A more complete understanding of the present invention, as well as further features and advantages of the present invention, will be obtained by reference to the following detailed description and drawings.

DETAILED DESCRIPTION

The present invention provides a digital signal processor having an instruction set that supports one or more non-linear functions using one or more look-up tables of reduced size. Generally, one or more look-up tables store a subset of values for a non-linear function and an interpolator interpolates at least two values obtained from the look-up table(s) to obtain the result using factorized polynomial interpolation. As used herein, the term "digital signal processor" shall be a processor that executes instructions in program code. Further, a hard-wired logic implementation of digital signal processing functions is not considered herein.

In this manner, the present invention supports non-linear functions by using a smaller look-up table than required by conventional techniques. As previously indicated, an exemplary look-up table may store on the order of 2,000 16 bit values, and thus require 32 kilobits of random access memory (RAM). With the present invention, a smaller look-up table can be employed to store a subset of the 2,000 values, such as 128 values. An interpolator will interpolate two or more values obtained from the smaller look-up table(s) to obtain the desired result. As discussed further below in conjunction with FIG. 3, the interpolation can be a linear interpolation or a higher order interpolation such as quadratic or cubic interpolation.

Figure 1:
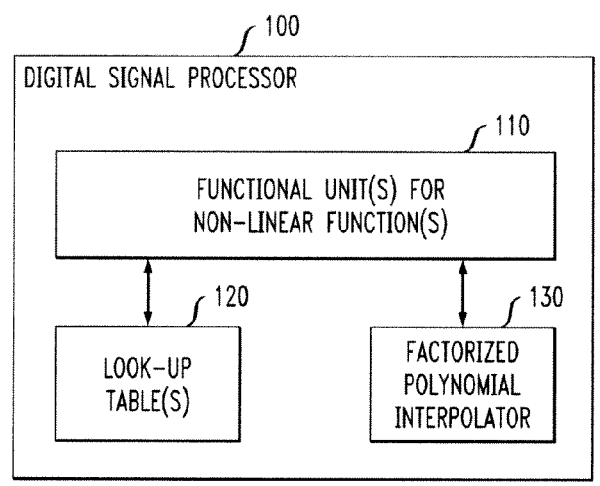
FIG. 1 is a schematic block diagram of an exemplary digital signal processor that incorporates features of the present invention.

FIG. 1 is a schematic block diagram of an exemplary digital signal processor 100 that incorporates features of the present invention. As shown in FIG. 1, the exemplary digital signal processor 100 includes one or more functional units 110 for non-linear functions. In addition, the digital signal processor 100 comprises one or more look-up tables 120 that store a subset of values for a non-linear function. Performance of the digital signal processor 100 may be further improved by employing a technique for mapping the input data to non-uniformly spaced sub-samples stored in the look-up table 120, such as an exponentially varying step-size, as described in U.S. patent application Ser. No. 12/324,931, filed contemporaneously herewith and entitled "Digital Signal Processor Having Instruction Set with One or More Non-Linear Functions Using Reduced Look-Up Table with Exponentially Varying Step-Size," incorporated by reference herein.

An interpolator 130 interpolates two or more values obtained from a look-up table 120 to obtain the desired result. The interpolator 130 may also include a modulo arithmetic unit (not shown) to support periodic functions, such as sine and cosine (e.g., by wrapping the input angle of the trigonometric sine and cosine functions).

Thus, in implementing the non-linear function, the non-linear functional unit(s) 110 obtain two or more values from the subset of values stored in the look-up table(s) 120 and then initiate the interpolator 130 to interpolate the two or more obtained sub-sample values to obtain the desired result.

As previously indicated, according to one aspect of the invention, the an interpolator 130 interpolates two or more values obtained from the look-up table(s) 120 to obtain the desired result using polynomial interpolation, such as a Taylor series. In addition, as discussed further below in conjunction with FIG. 4, a Horner scheme (canonical factorized form of a polynomial) can optionally be employed to minimize the hardware complexity in terms of number of multiplications and additions that are needed to implement the interpolation operation.

In various embodiments, the digital signal processor 100 may use hardware or a look-up table (or a combination thereof) to compute the non-linear values of the data. Generally, if the digital signal processor 100 is processing software code that includes a predefined instruction keyword corresponding to a non-linear math function and any appropriate operands for the function, the instruction decoder must trigger the appropriate non-linear functional units 110 that are required to process the instruction (e.g., connect two registers, apply one or more nonlinear mathematical operations on the values contained therein, and store the result in a third register). It is noted that a non-linear functional unit 110 can be shared by more than one instruction.

Generally, the present invention extends conventional digital signal processors to provide an enhanced instruction set that supports one or more non-linear functions using one or more look-up tables and an interpolation function. As shown in FIG. 1, a digital signal processor 100 in accordance with the present invention receives at least one number as an input, applies one or more non-linear functions to the input and generates an output value.

The disclosed digital signal processors may have a scalar architecture, as shown in FIG. 1, that processes a single number at a time, or a vector architecture, as discussed hereinafter in conjunction with FIG. 2, that processes one or more numbers simultaneously. In the case of a vector-based digital signal processor implementation, the input number is a vector comprised of a plurality of scalar numbers that are processed in parallel.

Figure 2:
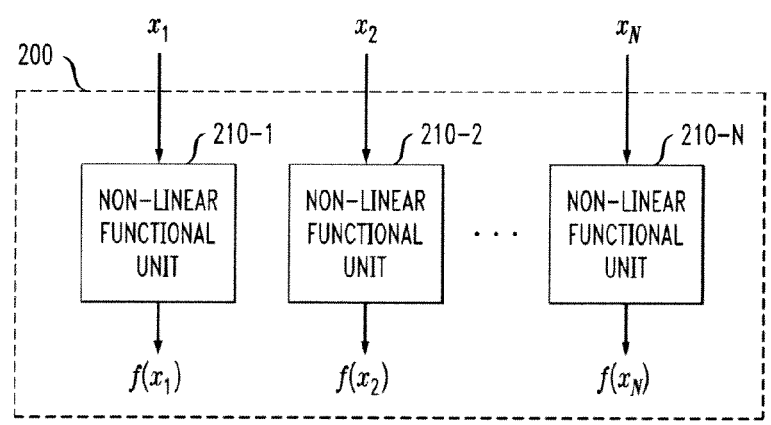
FIG. 2 is a schematic block diagram of an exemplary vector-based digital signal processor that processes one or more numbers simultaneously in accordance with an embodiment of the present invention.

FIG. 2 is a schematic block diagram of an exemplary vector-based digital signal processor 200 that processes one or more numbers simultaneously in accordance with an embodiment of the present invention. Generally, the vector-based implementation of FIG. 2 increases the number of MIPs (instructions per second), relative to the scalar implementation of FIG. 1, by performing different processes concurrently. Thus, the vector-based digital signal processor 200 contains plural non-linear functional units 210-1 through 210-N. For example, a dual digital signal processor 200 contains two non-linear functional units 210-1 and 210-1 that are capable of performing two independent non-linear function operations concurrently.

As noted above, the input to the vector-based digital signal processor 200 is a vector, X, comprised of a plurality of scalar numbers, $x_n$, that are processed in parallel. For example, assume a vector-based digital signal processor 200 supports a non-linear function for a vector, X, where X is comprised of scalar numbers $x_1$ through $x_4$. The exemplary function may be expressed as follows:

$$NL\_vec4(x_1, x_2, x_3, x_4, \text{type}, \text{mod}),$$

where type may be, for example, 'sin', 'cos', 'log 10', 'exp' or 'sqrt'. Mod='2*π' for a period of 2π, and '0' for non-periodic functions.

As previously indicated, an interpolator 130 interpolates two or more values obtained from the look-up table 120 to obtain the desired result.

Interpolation

In one embodiment, the interpolator 130 employs a linear interpolation, such as a linear spline, to interpolate two or more sub-sample values obtained from the look-up table 120 to obtain the desired result.

Figure 3:
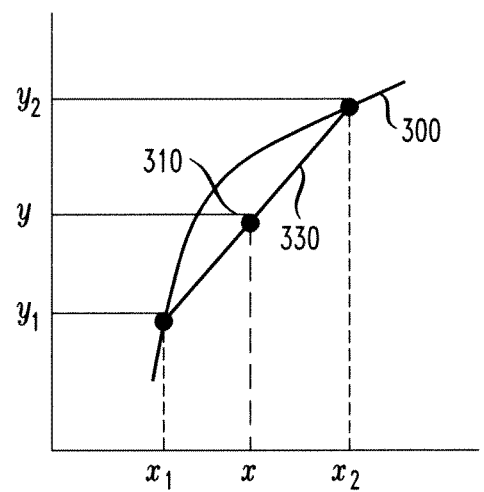
FIG. 3 illustrates a plot of a non-linear function 300 that may be processed in accordance with the present invention.

FIG. 3 illustrates a plot of a non-linear function 300 that may be processed in accordance with the present invention. As shown in FIG. 3, the non-linear function 300 is sub-sampled and the sub-sampled values, such as $x_1$ and $x_2$, can be stored in the look-up table 120. If the non-linear function 300 must be evaluated for a value, x, that is not stored in the look-up table 120, the digital signal processor 100 retrieves the two or more stored sub-sampled values, such as $y_1$ and $y_2$ that are stored for $x_1$ and $x_2$, and interpolates to find the value, y, for x, as follows:

$$y = m(x - x_1) + y_1$$

where m equals $(y_2 - y_1)/(x_2 - x_1)$.

It is noted that performance may optionally be further improved by employing one or more polynomial interpolation algorithms, such as a Taylor series, as described hereinafter.

Polynomial Interpolation

The present invention recognizes that performance may be further improved by employing a polynomial interpolation algorithm, such as a Taylor series, based on the following polynomial:

$$Y = a_n(x - x_1)^n + a_{n-1}(x - x_1)^{n-1} + \ldots + a_0$$

Factorized Polynomial Interpolation (Horner Scheme)

An embodiment of the present invention recognizes that the complexity of the above polynomial is significant, due to the number of multiplication operations that are required.

Thus, one embodiment of the present invention employs a Horner scheme to minimize the number of operations required to perform the polynomial interpolation.

In the exemplary case of a third order polynomial, the above polynomial expression can be rewritten as follows:

$$Y=a_0+(x-x_1)*(a_1+(x-x_1)*(a_2+(x-x_1)*a_3)).$$

In this manner, only 3 multiply-accumulate operations are needed to implement an exemplary third order polynomial.

Figure 4:
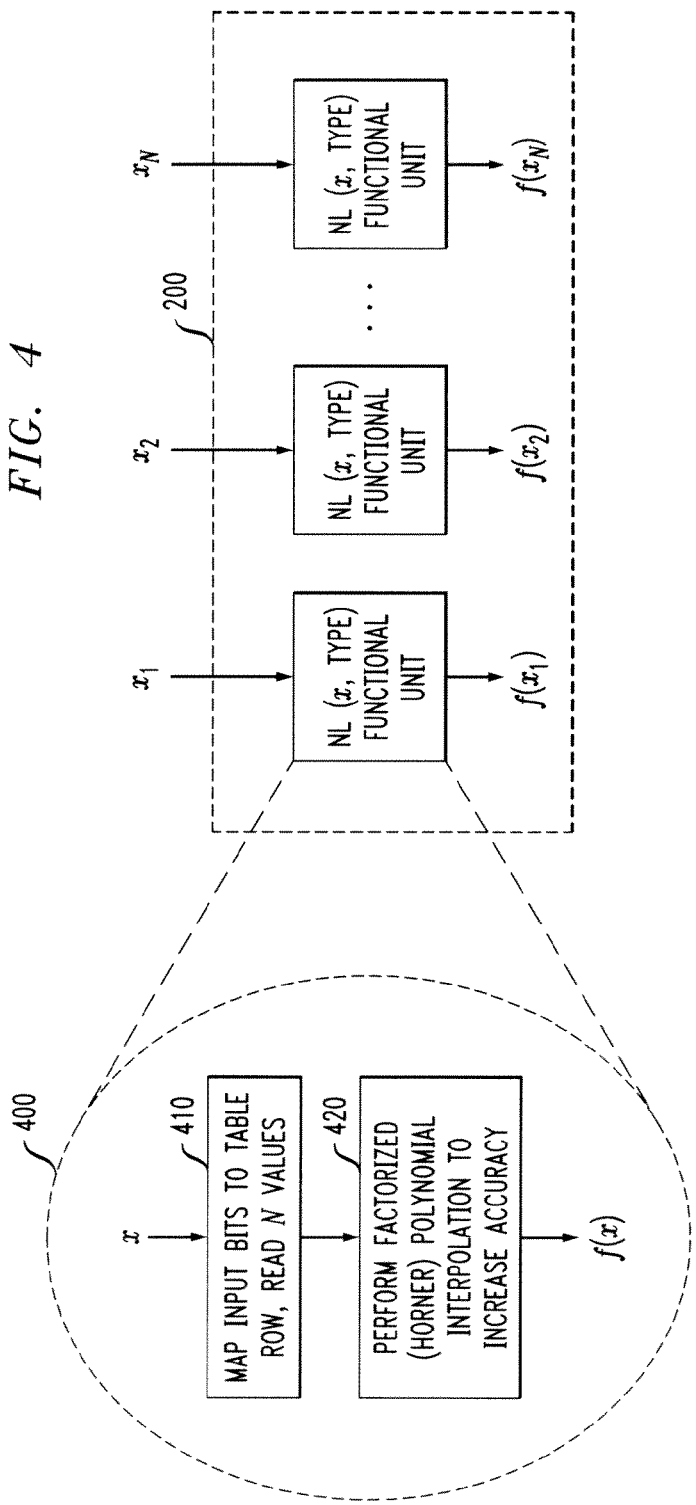
FIG. 4 is a flow chart illustrating an exemplary interpolation process 400 for a non-linear function that employs factorized polynomial interpolation in accordance with the present invention.

FIG. 4 is a flow chart illustrating an exemplary interpolation process 400 for a non-linear function that employs factorized polynomial interpolation in accordance with the present invention. The interpolation process 400 may be implemented, for example, by one or more functional units 210 from the exemplary vector-based digital signal processor 200 of FIG. 2. As shown in FIG. 4, the exemplary interpolation process 400 initially maps the input bits to a table row during step 410 and reads N values. Thereafter, factorized (Horner) polynomial interpolation is performed during step 420.

CONCLUSION

While exemplary embodiments of the present invention have been described with respect to digital logic blocks and memory tables within a digital signal processor, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method performed by a vector-based digital signal processor for evaluating a non-linear function for a vector, x, comprising:

in response to a predefined software instruction keyword for said non-linear function, performing the following steps, wherein said vector, x, comprises a plurality of numbers and wherein said vector-based digital signal processor processes said plurality of numbers substantially simultaneously, wherein said predefined software instruction keyword for said non-linear function is part of an instruction set of said vector-based digital signal processor:

invoking at least one non-linear hardware functional unit that implements said non-linear function, wherein said at least one non-linear hardware functional unit is configured to perform the following steps for each component of said vector, x, using hardware:

obtaining at least two sets of values from at least one look-up table for said non-linear function that are near components of said vector, x, wherein said at least one look-up table is in a random access memory (RAM) of said vector-based digital signal processor; and interpolating said at least two obtained sets of values to obtain a vector result, y, using a factorized polynomial interpolation.

2. The method of claim 1, further comprising the step of performing a modulo arithmetic operation for a periodic non-linear function.

3. The method of claim 1, wherein said vector-based digital signal processor executes said predefined software instruction keyword from program code.

4. The method of claim 1, wherein said at least one look-up table stores a subset of values for said non-linear function.

5. The method of claim 1, wherein said factorized polynomial interpolation comprises a Taylor series.

6. The method of claim 1, wherein said factorized polynomial interpolation comprises a Horner scheme.

7. The method of claim 1, wherein said vector-based digital signal processor employs one or more of hardware and a look-up table to compute the vector result, y.

8. The method of claim 1, wherein said non-linear function comprises one or more of a sine function, a cosine function, a logarithmic function, an exponent function and a square root function.

9. A vector-based digital signal processor for evaluating a non-linear function for a vector, x, comprising:

at least one non-linear hardware functional unit that implements said non-linear function, wherein said at least one non-linear hardware functional unit is invoked by said vector-based digital signal processor in response to a predefined software instruction keyword for said non-linear function, wherein said at least one non-linear hardware functional unit is configured to perform the following steps using hardware, wherein said vector, x, comprises a plurality of numbers and wherein said vector-based digital signal processor processes said plurality of numbers substantially simultaneously, wherein said predefined software instruction keyword for said non-linear function is part of an instruction set of said vector-based digital signal processor:

obtain at least two sets of values from at least one look-up table that stores a subset of values for said non-linear function, wherein said obtained at least two sets of values are near components of said vector, x, wherein said at least one look-up table is in a random access memory (RAM) of said vector-based digital signal processor; and interpolate said at least two sets of values obtained from said at least one look-up table to obtain a vector result, y, using a factorized polynomial interpolation.

10. The vector-based digital signal processor of claim 9, wherein said at least one non-linear hardware functional unit is further configured to perform further comprising a modulo arithmetic operation for a periodic non-linear function.

11. The vector-based digital signal processor of claim 9, wherein said vector-based digital signal processor executes said predefined software instruction keyword from program code.

12. The vector-based digital signal processor of claim 9, wherein said factorized polynomial interpolation comprises a Horner scheme.

13. The vector-based digital signal processor of claim 9, wherein said vector-based digital signal processor employs one or more of hardware and a look-up table to compute the vector result, y.

14. The vector-based digital signal processor of claim 9, wherein said non-linear function comprises one or more of a sine function, a cosine function, a logarithmic function, an exponent function and a square root function.

15. An integrated circuit, comprising:

a vector-based digital signal processor for evaluating a non-linear function for a vector, x, comprising:

at least one non-linear hardware functional unit that implements said non-linear function, wherein said non-linear hardware functional unit is invoked by said vector-based digital signal processor in response to a predefined software instruction keyword for said non-linear function, wherein said at least one non-linear hardware functional unit is configured to perform the following steps using hardware, wherein said vector, x, comprises a plurality of numbers and wherein said vector-based digital signal processor processes said plurality of numbers substantially simultaneously, wherein said predefined software instruction keyword for said non-linear function is part of an instruction set of said vector-based digital signal processor:

obtain at least two sets of values from at least one look-up table that stores a subset of values for a said non-linear function, wherein said obtained at least two sets of values are near components of said vector, x, wherein said at least one look-up table is in a random access memory (RAM) of said vector-based digital signal processor; and interpolate said at least two sets of values obtained from said at least one look-up table to obtain a vector result, y, using a factorized polynomial interpolation.

16. The integrated circuit of claim 15, wherein said at least one non-linear hardware functional unit is further configured to perform a modulo arithmetic operation for a periodic non-linear function.

17. The integrated circuit of claim 15, wherein said vector-based digital signal processor executes said predefined software instruction keyword from program code.

18. The integrated circuit of claim 15, wherein said factorized polynomial interpolation comprises a Horner scheme.

19. The integrated circuit of claim 15, wherein said vector-based digital signal processor employs one or more of hardware and a look-up table to compute the vector result, y.

20. The integrated circuit of claim 15, wherein said non-linear function comprises one or more of a sine function, a cosine function, a logarithmic function, an exponent function and a square root function.

* * * * *